United States Patent
Cavalli et al.

(10) Patent No.: US 7,092,453 B2
(45) Date of Patent: Aug. 15, 2006

(54) AUTOMATIC METHOD FOR POWER CONTROL AND PHY MODE SWITCHING CONTROL IN ADAPTIVE PHY MODE SYSTEMS

(75) Inventors: Giulio Cavalli, Milan (IT); Claudio Santacesaria, Milan (IT)

(73) Assignee: Siemens Information and Communication Networks S.p.A., Milan (IT)

( * ) Notice: Subject to any disclaimer, the term of this patent is extended or adjusted under 35 U.S.C. 154(b) by 746 days.

(21) Appl. No.: 10/025,454

(22) Filed: Dec. 26, 2001

(65) Prior Publication Data

US 2002/0191706 A1    Dec. 19, 2002

(51) Int. Cl.
H04L 27/04 (2006.01)
H04L 27/12 (2006.01)
H04L 27/20 (2006.01)

(52) U.S. Cl. ...................................... 375/295
(58) Field of Classification Search ................ 375/295; 455/13.4; 370/401, 352
See application file for complete search history.

(56) References Cited

U.S. PATENT DOCUMENTS

| | | | |
|---|---|---|---|
| 5,392,459 A | 2/1995 | Baba et al. | |
| 5,577,087 A | 11/1996 | Furuya | |
| 5,982,813 A * | 11/1999 | Dutta et al. | 375/219 |
| 5,991,618 A * | 11/1999 | Hall | 455/425 |
| 6,134,230 A | 10/2000 | Olofsson et al. | |
| 6,259,928 B1 * | 7/2001 | Vembu | 455/522 |
| 6,385,462 B1 * | 5/2002 | Baum et al. | 455/522 |
| 6,430,394 B1 * | 8/2002 | Boyden | 455/13.4 |
| 6,452,964 B1 * | 9/2002 | Yoshida | 375/222 |
| 6,714,551 B1 * | 3/2004 | Le-Ngoc | 370/401 |
| 6,760,566 B1 * | 7/2004 | Wright et al. | 455/13.4 |
| 2002/0137457 A1 * | 9/2002 | Nivens et al. | 455/13.4 |
| 2003/0109261 A1 * | 6/2003 | Razavilar et al. | 455/452 |

FOREIGN PATENT DOCUMENTS

| | | |
|---|---|---|
| WO | WO 99/20016 | 4/1999 |
| WO | WO 99/21287 | 4/1999 |
| WO | WO 00/41318 | 7/2000 |
| WO | WO 01/10048 A1 | 2/2001 |

* cited by examiner

Primary Examiner—Jay K. Patel
Assistant Examiner—Curtis Odom
(74) Attorney, Agent, or Firm—Birch, Stewart, Kolasch & Birch, LLP

(57) ABSTRACT

The present invention relates to adaptive phy mode systems, in which the modulation type and the forward error correction, jointly called phy mode, depend on the addressed terminal. Specifically, the present invention defines a power control technique for the terminal stations that also commands the phy mode switching. In particular, the peripheral stations transmit with the several phy modes so that the signals are received at the master station making a given performance related parameter equal. Then a hysteresis is defined which regulates the phy mode switching, setting suitable power thresholds of the signal. To keep the received power close to the working point of the appropriate phy mode, the master station relies on the received power level together with information regarding the unused power, which is available in the peripheral station. Thus, interference is reduced, and link coverage and throughput are optimized.

11 Claims, 1 Drawing Sheet

AUTOMATIC METHOD FOR POWER CONTROL AND PHY MODE SWITCHING CONTROL IN ADAPTIVE PHY MODE SYSTEMS

BACKGROUND AND FIELD OF THE INVENTION

The present invention relates particularly to point-to-point and point-to-multipoint radio network systems, as well as to other transmission systems working on different physical media. In particular this invention applies to adaptive phy mode systems.

INVENTION BACKGROUND

In point-to-multipoint systems, whatever physical medium is used, a master station and one or several peripheral stations, also called terminals, are defined. While a particular embodiment of the present invention, applied to point-to-multipoint radio system, will be shown and described, it should be understood that the present invention is not limited thereto since other embodiments may be made by those skilled in the art.

The transmissions from the master station to one or more peripheral stations are made on one logical channel, also called "downstream channel", typically with time division multiplexing.

The transmissions from the peripheral stations to the master are made on another logical channel, also called "upstream channel". The upstream is divided from the downstream channel by time division duplexing or by frequency division duplexing, that is the transmissions in upstream direction could be made either in different frequency channels, or in the same frequency channel but in different time-intervals.

In other physical media alternative duplexing mechanisms could be used.

With the term "phy mode" we mean the combination of modulation and FEC (Forwarding Error Check). Each phy mode is characterized by a different throughput and a different robustness.

In well known art we can distinguish two different system generations: traditional systems, in which the master and the peripheral stations could transmit using only one phy mode, even if the master may not use the same as the peripheral stations, and new system generations which can support adaptive phy modes. With the term "adaptive phy modes" we mean that the transmission stations, master or slaves, can use, in the reception or in the transmission of data, a certain number of phy modes, in different time intervals and in the same frequency channel.

The transmitted power level cannot be the same for all the peripheral stations, but it is function of the distance from the master station, of climate conditions, and of phy modes. In traditional systems, which do not support adaptive phy modes, an automatic power level control, also called "ATPC", regulates the transmission level of the peripheral stations. In the known art, with the ATPC techniques in traditional systems, the master station passes, in the downstream channel, the information in order to regulate the transmitted power level of each peripheral station. In this way the mean power level of the signals transmitted by the peripheral stations and received by the above-mentioned master station is kept near a certain level.

A minimum received level, also called "threshold level", and a typical received level, near which the master receives the signals somewhat higher than the threshold level, also called "working point", are defined.

Once the working level is set, taking implementations issues into account, the master station automatically instructs the peripheral stations, by means of signaling messages, so that the peripheral stations transmit the correct power level in order to be received by the master near the working point.

The above-mentioned working points and threshold levels are reference points, computed from implementation issues and from system dimensioning.

Air fading is time variable. In traditional systems the received power level is kept near the working point. When the peripheral station has not the sufficient power to counteract for example rain fading, the received power level at the master decreases.

In non adaptive phy modes systems the master station and the peripheral stations transmit and receive using the same phy mode, defined in advance at the implementation of the system. Accordingly the setting of the transmission power level of the peripheral stations regards only the phy mode used for the transmission by each peripheral station. For example consider a peripheral station transmitting a phy mode 16QAM without FEC. Typically, in normal working condition, the signal transmitted by this peripheral station is received by the master station near the working point. In this condition the master station tells to the peripheral station that the transmitted power level is correct. Let's presume now that the fading increases, for example due to rain. The signal is received by the master station with a power level lower and lower as the rain fading increases. In this transition the peripheral station transmits always at the same power level. When the signal received at the master station reaches a threshold, lower than the working point, the master station tells the peripheral station to increase the transmitted power level in order to counteract the fading. With this procedure the received power level remains close to working point. In the same way the decreased attenuation is counteracted. If the received signal passes a threshold above the working point, the master station tells the peripheral station to reduce the transmitted power level. When the received power level is back to the working point, with proper signaling messages, the master station tells the peripheral station to keep the transmitted power level constant.

The ATPC techniques for traditional systems are well known (for example see PAT 1997-463974). The constraints to be defined in the project stage are, besides the working point, the maximum and minimum levels that regulate the messaging signals in order to increase or decrease the transmitted power level of the peripheral stations. The above-mentioned maximum and minimum thresholds have to be chosen in the proper way; not too far from the working point, in order to quickly counteract the signal fading; not too close to the working point, in order to avoid uncontrollable cycles due to message propagation and response time.

In some systems the thresholds are not defined, and the control is made by periodical messages, always present even with small fading. In all cases, ideally, the algorithm controls the transmitted power level in order to keep the mean received signal constant and close to the working point of the used phy mode.

In adaptive phy mode systems, the phy mode is not defined by default, but the master station and the peripheral stations can switch from one phy mode to another while the system is working. The management and control messages between the master station and the peripheral stations are transmitted using the pre-defined most robust phy mode. The data are transmitted using one of the phy modes, decided time by time by the master station. Depending on some parameters, such as distance, climate condition and interference, the master station can tell the peripheral station to switch from a phy mode to another one supported by both the master and the peripheral station.

Since adaptive phy mode systems are new generation systems, in the known art there is no reference to methods for applying power control to these systems, as far as we know. The most straightforward method to control the transmission power of the peripheral stations, in this case, is to equalize the mean power level received by the master station for all peripheral stations and for all phy modes as well.

SCOPE AND SUMMARY OF THE INVENTION

This invention applies to new transmission systems which support adaptive phy modes, and which adopt an ATPC mechanism.

This invention defines an optimal method to control the power and the phy mode of the transmission for a peripheral station; the features of this method are minimizing of generated interference and optimization of performances. According to this invention, a particular algorithm, stilled called ATPC, plays a relevant role in the adaptive phy mode systems, since it is responsible for the phy mode switching, as well as for the power control.

In those adaptive phy mode systems, due to the fact that the peripheral station transmits using different phy modes in different time intervals, defining how the power level, related to the phy modes, is received by the master station and how it is transmitted by the peripheral stations is mandatory.

A threshold power level different for every phy mode, is defined. It represents the minimum received power level that guarantees the requested performances. A received power level, called "working point", different for every phy mode and higher than the threshold power level of a certain margin, is also defined.

According to the present invention the transmitted power from the peripheral stations is set in order to have, at the master station, a received power close to the working point of the used phy mode; according to a dependent claim the above-mentioned working point is set so that the signal is received with equal decision distance, no matter what the phy mode is; for example, with QAM modulations without any type of FEC, the decision distance is defined as the distance among the symbols of the constellation on the phase vector plane; similarly the decision distance is defined for other types of modulation and in the case of FEC; with equal decision distance similar performances are obtained, in particular in term of "bit error rate" (BER).

Another way to obtain similar performance, claimed in another dependent claim, consists in specifying the above-mentioned gap between threshold level and working point as constant and independent from the phy mode.

It is possible, as well, to define directly, as it is claimed in another dependent claim, the working points so that every phy mode has exactly the same performance in terms of BER.

Managing the received power, and consequently the transmission power, in this way has the effect to minimize the interference, both the co-channel and the adjacent channel one.

Besides the optimum working point, the present invention describes, in dependent claims, an algorithm for the ATPC suitable to manage the switching of the phy modes. Unlike traditional systems, ATPC techniques for adaptive phy mode systems have to take into account a certain amount of phy modes. In fact the master station, besides sending signaling messages to the peripheral stations in order to reduce or increase the transmitted power level, in the adaptive system, has to send signaling messages related to the switching of the phy modes. According to the invention the algorithm that controls the power and the one that controls the phy mode switching interact with each other. The power level received by the master station, and if the information is accessible, the knowledge of the power not currently used but available in the peripheral stations, regulate the commands to change phy mode. Besides the above-mentioned reference levels, threshold levels and working points, the switching phy mode levels have to be set. These levels regulate the switching between the phy modes. If the received signal continues to increase or decrease, in spite of the messages sent to a peripheral station by a master station to increase or decrease the transmitted power level, when one of the switching level is reached, the phy mode is switched. In this way the coverage and the throughput of the link are maximized. Moreover, if the master station knows that the non-used available power of the peripheral station is sufficient to permit the transmission of a different phy mode, this piece of information can be used for the switching of the phy mode.

Hysteresis is a feature of the claimed algorithm. It is defined by the choice of several switching levels, one for the switching from a first phy mode to a second phy mode and another one for the switching from the above-mentioned second phy mode to the first one.

BRIEF DESCRIPTION OF THE DRAWINGS

The invention, together with further objects and advantages thereof, may be understood with reference to the following description, taken in conjunction with the accompanying drawings and in which.

DETAILED DESCRIPTION OF THE PREFERRED EMBODIMENTS

According to the present invention the phy modes, transmitted by a peripheral station, are received by the master station approximately with the same performance; this can be achieved with a constant gap between the working point and the threshold level for each phy mode, or working with the same BER, or with equal decision distance. These three strategies lead to similar results, even if not strictly equivalent from the mathematical point of view, and they contrast to the previous strategy, prior to this invention, that equalizes the mean power level of the signals received at the master station.

In other words, according to the invention, between any two phy modes there is a gap of power, depending on the considered phy modes. For example, choosing as default phy mode a QPSK modulation and, as FEC, a Reed Solomon code (RS) concatenated to a convolutional code (CC) with rate 2/3, and as second phy mode a QPSK modulation with RS only as FEC, we have a 4 dB gap between the mean power of these two phy modes.

From now on we describe a particular embodiment of the invention referred to these two phy modes: QPSK without FEC and 16QAM without FEC. It should be understood that the present invention is not limited thereto since other embodiments may be made by those skilled in the art.

Figure 1:
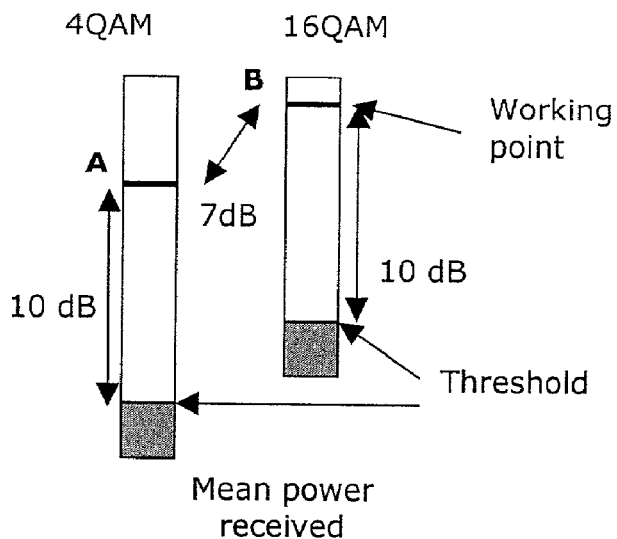
FIG. 1 shows the received power levels of a signal transmitted by a peripheral station that supports adaptive phy mode.

FIG. 1 shows how the signal is received by the master station in normal working conditions (without rain fading), with an equal gap power strategy (10 dB) with respect to the threshold. The signals transmitted by the peripheral stations are received by the master station with two power levels: data transmitted using QPSK phy mode are received at the working point A; data transmitted using phy mode 16 QAM are received at the working point B, that is 7 dB above the point A.

Figure 2:
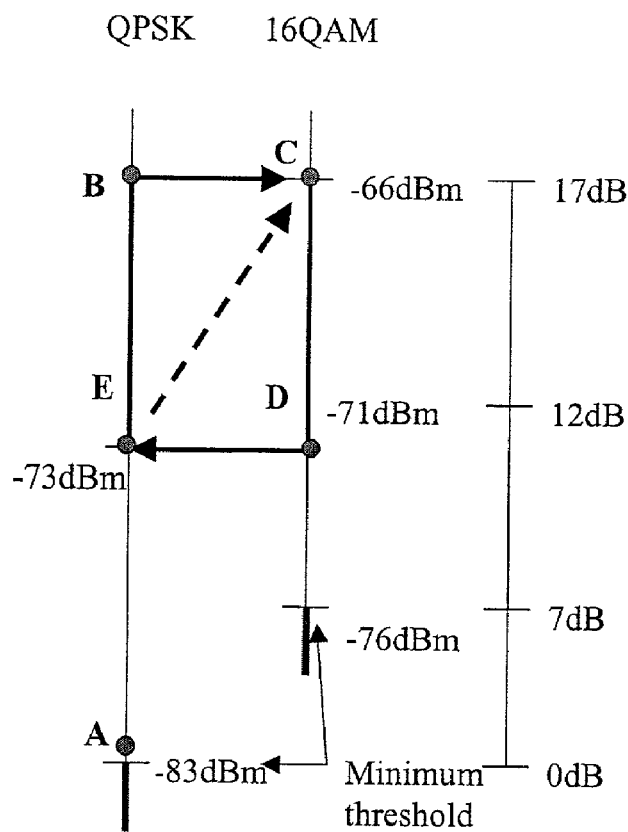
FIG. 2 shows the hysteresis algorithm in adaptive phy mode systems.

In FIG. 2 the power control algorithm combined with the adaptive phy mode switching control, claimed in a dependent claim, is sketched. The algorithm is described referring to absolute power levels that should not be considered a limitation for the invention since it the general idea of the algorithm, not some specific threshold values are claimed. In high fading a signal transmitted by a peripheral station, working with QPSK phy mode, is received by the master station in point A of FIG. 2, close to the threshold level. When the fading decreases, in case of better climate conditions, the above-mentioned signal is received with an higher power, moving from point A to point B. During this transition the peripheral station transmits with the same power, the maximum available. When the received signal reaches the point B, the master station tells the peripheral station to switch the phy mode. The peripheral station starts to transmit with the 16QAM phy mode, keeping the transmission power level as used in point B, the maximum available. From point B we pass to point C of FIG. 2. The fading continues to decrease. The signal continues to be received gradually with higher and higher power level. Now the master station tells the peripheral station to reduce the transmitted power. In this way the received power level is kept close to point C.

In the situation of minimum fading the system works in point C, where the peripheral station transmits with the power level needed to the signal to be received in the above mentioned point C.

Now we assume that the fading increases. The signal tends to be received at a lower power level, but the master station tells the peripheral station to increase the transmitted power level in order to keep the received signal in point C. When the peripheral station has not the opportunity to increase any further its power in order to counteract the fading, the received signal moves inevitably from point C towards point D. When the received signal reaches point D, the master station tells the peripheral station to switch the phy mode, transmitting QPSK phy mode instead 16QAM phy mode. After this operation the signal is received in point E. It's clear that a gap between point D and the threshold of 16QAM is present; the transition happens at this point and not closer to the threshold level due to the possibility that further fading could push the signal under the threshold level before the switching. Points B, C, D, and E define the hysteresis of the system. Hysteresis is mandatory in order to avoid uncontrollable switching cycles from one phy mode to another when the received signal is close the switching level.

The received power level in point D is also called switching threshold level from phy mode 16QAM to phy mode QPSK. The received power level in point B is also called switching threshold level from phy mode QPSK to 16QAM. The received power level in point C, that in the example is equal to the power level in point B, is the working point of the phy mode 16QAM. The power level in point E, that in the example is equal to the level in point D, is the working point of the phy mode QPSK.

In a different embodiment the transaction between the phy mode QPSK to 16QAM can be made according to the dotted line in FIG. 2. According to this other embodiment, when the fading is decreasing and the system works in point E, the master station tells the peripheral station to reduce the transmitted power level, keeping the received power level in point E until the power margin permits the switching directly to point C; this requires the master station to keep in memory, or to be informed about, the allowed power of the peripheral station; the complexity is higher, but this buys a lower interference.

While a particular embodiment of the present invention has been shown and described, it should be understood that the present invention is not limited thereto since other embodiments may be made by those skilled in the art.

It is thus contemplated that the present invention encompasses any and all such embodiments covered by the following claims.

The invention claimed is:

1. Method to adaptively control the phy mode of the transmissions from a peripheral station to a master station in either a point-to-multipoint or point-to-point transmission system with automatic transmit power control, called ATPC, and comprising the steps of:

receiving, at the peripheral station, power control signaling messages from the master station and regulating the transmitted power;

receiving, at the peripheral station, phy mode switching messages from the master station and changing the phy mode of the transmission;

transmitting said power control signaling messages from the master station to keep the received power inside an ATPC range;

transmitting a phy mode switching message from the master station in case the received power level reaches either a lower or a higher switching threshold associated with each phy mode used by the peripheral station for its transmissions, in order to command switching from a less robust and more efficient phy mode to a more robust and less efficient phy mode, or vice versa, in a way to establish a hysteresis cycle between said switching thresholds;

transmitting said power control signaling messages from the master station in order to keep the received mean power substantially close to a reference received power level or working point predefined for each phy mode;

checking if the peripheral station has sufficient available transmission power in order to guarantee the transmission using said less robust phy mode with such a power level that allows the master station to receive the transmitted signal above the working point of said less robust phy mode; and transmitting in case the check is affirmative a phy mode switching message towards a less robust and more efficient phy mode.

2. The method of claim 1, wherein said working point of each phy mode is set by adding a margin, constant and independent from the phy mode, to the threshold level of the corresponding phy mode.

3. The method of claim 1, wherein said working point, dependent on the phy mode, is set by equalizing the performances in terms of bit error rate of each phy mode to a constant value, said constant value being independent on the used phy mode and being coincident with the required performance.

4. The method of claim 1, wherein said working point, dependent on the phy mode, is set by equalizing decision distances of several phy modes.

5. The method of claim 1, wherein switching levels overlap the working points of the phy modes toward which the switching applies.

6. The method of claim 1, wherein said checking if the peripheral station has sufficient available power is performed by the master station by reading its own memory where the information is stored.

7. The method according to claim 1 wherein checking if the peripheral station has sufficient available power is performed by the master station upon the reception of this information from the peripheral station.

8. The method according to claim 1 wherein the phy modes include two different types of quadrature modulation.

9. The method according to claim 1 wherein the phy modes include QPSK modulation and 16QAM.

10. The method according to claim 8 wherein the phy modes include a Forwarding Error Check (FEC).

11. The method according to claim 9 wherein the phy modes include a Forwarding Error Check (FEC).

* * * * *